Dec. 13, 1966 W. R. KOEHN Re. 26,124

INJECTION SET AND FLOW METER FOR PARENTERAL FLUIDS

Original Filed June 8, 1960

INVENTOR.
Wilber R. Koehn
BY
Curtis, Morris & Safford
ATTORNEYS

United States Patent Office

Re. 26,124
Reissued Dec. 13, 1966

26,124
INJECTION SET AND FLOW METER FOR PARENTERAL FLUIDS

Wilbur R. Koehn, 20 Shorewood Drive, Sands Point, N.Y.

Original No. 3,101,710, dated Aug. 27, 1963, Ser. No. 34,725, June 8, 1960. Application for reissue July 27, 1965, Ser. No. 477,358
6 Claims. (Cl. 128—214)

Matter enclosed in heavy brackets [ ] appears in the original patent but forms no part of this reissue specification; matter printed in italics indicates the additions made by reissue.

The present invention relates to flow meters and more particularly to a float type flow meter for accurately indicating on the same graduated scale the flow rate of fluids of a group having different specific gravities and viscosities.

While the flow meter of the present invention may have other applications, it is particularly adapted for indicating the flow rate of any of a group of parenteral fluids having different specific gravities and viscosities as they are injected into a body of a patient. The group of parenteral fluids having different specific gravities which can be accurately indicated on the same graduated scale comprises solutions of dextrose in the range of from 1% to 20% by weight, normal saline solutions (saline solutions at the concentration normally found in the human body) and other solutions containing dissolved salts normally occurring in the body and known as electrolytes, such as phosphates, chlorides, potassium, sodium, etc. Each of these parenteral fluids has a different specific gravity. For example, 5% to 20% dextrose solutions have a specific gravity ranging from 1.05 to 1.20, a normal salt solution has a specific gravity of 1.009 and other solutions containing dissolved salts have specific gravities only slightly different from that of water.

The flow meter of the present invention may also be used to accurately indicate the flow of bloods having different specific gravities and viscosities on the same graduated scale, but a different scale is required than that used for the previous group of parenteral fluids because of the difference in the range of their viscosities. The specific gravity of different bloods may vary normally from 1.048 to 1.066, but vary in a greater range for diseased conditions. Likewise the viscosity of blood normally varies from 3.5 to 5.4, but the range for diseased conditions is from about 2 to 9. When any of these parenteral fluids are being injected into a patient it is essential that the flow rate be known and meters are used for this purpose. None of the conventional flow meters currently used to indicate rates of flow of parenteral fluids and/or blood are accurate for different solutions of a group, such as dextrose, normal saline and electrolyte solutions containing dissolved salts in one group or different bloods of another group.

The need for an accurate meter which will indicate the flow rate of different parenteral fluids of a group on the same scale has long been recognized and attempts have heretofore been made to supply such a flow meter. The conventional apparatus for measuring the rate of flow is a drip chamber by which the number of drops per minute may be counted during an injection. Such a drip chamber requires constant attention and is inherently inaccurate because of changes in temperature, sizes of drops and errors in counting and timing the drops. Another meter currently used comprises a member immersed in the fluid and moved upwardly in a measuring chamber by the drag of the fluid flowing in the same direction. Such a meter has been found by tests to have as much as a 50% error in the flow rates of different parenteral fluids. To avoid such error, a chart is provided with the meter to translate the meter reading to the flow rate for the particular parenteral fluid being injected. Still another flow meter proposed for injection apparatus for parenteral solutions has a cylindrical bore with a float therein, but this meter will merely indicate when flow occurs.

Float type flow meters used at the non-critical flow velocities necessary when injecting parenteral fluids are, in general, only adapted to accurately measure the flow of one particular fluid. Such meters may comprise a chamber having either an upwardly or downwardly tapered wall with a float therein. In the upwardly tapered type, the float has a specific gravity greater than the specific gravity of the liquid being measured and is moved upwardly in the meter chamber by the drag force produced by the flow of liquid. The drag force decreases as the area between the float and chamber increases and the velocity of the fluid flowing between the float and chamber decreases until the drag force equals the force of gravity. The float will then have a position of equilibrium which indicates a particular rate of flow. In this type of flow meter the buoyant and drag forces acting on the float are additive. A construction has heretofore been proposed in this type of meter having edges on the movable element to compensate for different viscosities, but this meter then requires a critical flow condition (very high velocity) and even then does not compensate for specific gravity.

In a float meter of the type having a chamber with a downwardly tapered wall, the specific gravity of the float is less than the specific gravity of the fluid. The float is moved to an equilibrium position in the chamber by the opposing upward buoyant and downward drag forces of the flowing liquid acting on the float. If the flow rate increases the float will move to a new equilibrium position where the velocity of the fluid will be the same, but providing a larger area between the float and wall of the chamber through which the fluid flows. Thus, the position of the float in the float chamber is calibrated for a particular liquid to accurately indicate different rates of flow. However, when used with another fluid having a different specific gravity the float will not have the same equilibrium position in the chamber for the same rate of flow as the liquid for which the meter was calibrated.

One of the objects of the present invention is to provide a flow meter which will accurately indicate the rate of flow of a plurality of fluids having different specific gravities and viscosities.

Another object is to provide an injection set for parenteral fluids having a flow meter which will accurately indicate on a single calibrated scale the flow rate of different parenteral fluids of a group.

Another object is to provide an injection set for blood having a flow meter which accurately indicates the flow rate of different bloods having different specific gravities.

Still another object is to provide a flow meter of the type indicated which is of simple and compact construction, adapted for economical manufacture and one which is reliable in operation.

These and other objects will become more apparent from the following description and drawing in which like reference characters denote like parts throughout the several views. It is to be expressly understood, however, that the drawings are for the purpose of illustration only and are not a definition of the limits of the invention, reference being had for this purpose to the appended claims.

Figure 2:
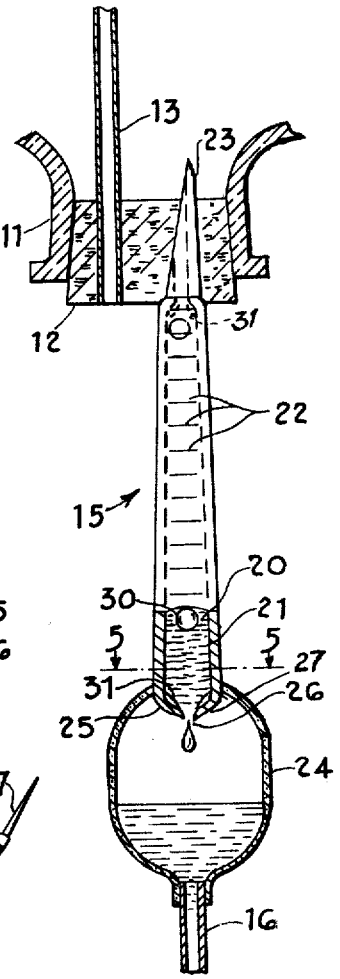
FIGURE 2 is an enlarged side elevational view of the flow meter partly in section to show the downwardly and outwardly tapered wall of the float chamber in the direction of flow and illustrating the float at different positions in the chamber.
Figure 7:
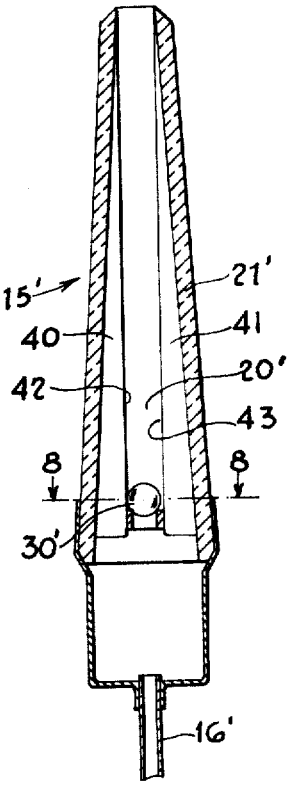
Figure 8:
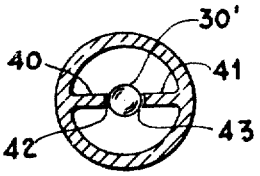

FIGURE 7 is a view similar to FIGURE 2 illustrating a flow meter of modified construction particularly adapted for measuring bloods having different specific gravities; and, FIGURE 8 is a transverse sectional view taken on line 8—8 of FIGURE 7 to show the fins projecting inwardly from the side wall of the downwardly tapered float chamber to provide a cage in which the float moves vertically in the chamber.

The present invention is based in part on the discovery that the drag force on an immersed float produced by certain liquids of a group at any particular flow rate increases with increases in the specific gravity of the liquids; and in part in utilizing this discovery as a basis for a meter construction which will accurately indicate the flow rates of the different liquids on the same calibrated scale. More particularly, it was discovered that the drag force produced on a float by different parenteral fluids such as dextrose solutions at non-critical flow conditions (less than critical flow velocity) is functionally related to increases in the specific gravities of the solutions. Also, it was found that the drag force produced by bloods of different specific gravities, while different from the drag force produced by dextrose solution (different range), also increases with increases in the specific gravity of the blood. However, the change in drag force produced on the float by liquids of different specific gravities, without further compensation, will not produce an accurate reading for fluids having different specific gravities on the same calibrated scale.

To produce this result, the increase in the buoyant force produced on the float, due to the difference in the specific gravities of the liquids being measured, must equal the increase in the drag force on the float at the same position in the float chamber and at the same flow rate. This is accomplished in accordance with the present invention by selecting a float having a particular specific gravity for the group of liquids being measured. Without subscribing to any particular theory of operation which produces these results, it is believed that the mode of operation is as next explained. Let it be assumed that a float of 1 cc. is used with different liquids having different specific gravities of 1.00 and 1.10, respectively. If a float having a specific gravity of .90 is used, it will produce a buoyant force of .10 gm. in the liquid of 1.00 specific gravity and cause the float to move to a position in the float chamber where the velocity of the liquid flowing past the float will produce a drag force of .10 gm. Now if a liquid of 1.1 specific gravity is used, the float will be buoyed up by a force of .20 gm. However, if the increased drag produced by the liquid of higher specific gravity at the same flow rate and at the same position in the float chamber increases only .05 gm. to .150, the float will move to a different position in the float chamber at the same flow rate. On the other hand, if a float of .95 specific gravity is used, the buoyant force in the liquid of 1.10 specific gravity will increase to .150 gm. and the drag force will increase to .150 gm. to produce equilibrium forces on the float at the same position in the float chamber for both liquids at the same flow rate.

In accordance with the present invention, a float type meter is provided having a downwardly tapered float chamber with a float therein of a selected specific gravity which will accurately indicate the flow rate of liquids having different specific gravity on the same calibrated scale. It has been found that a float of a particular specific gravity can be selected for a particular group of liquids having different specific gravities which will move to the same position of equilibrium for the same rates of flow. The selection of a float of the particular specific gravity required for the liquids of different specific gravities may be determined experimentally.

When liquids having more than two different specific gravities are to be measured on the same scale, a float is selected having a specific gravity to produce a change in buoyant force by the different liquids which is a median between the drag forces produced by the different liquids on the float at the same position in the float chamber and at the same flow rate. While such a meter for more than two liquids will not be completely accurate it has been found to have a permissible error of 2% for all parenteral fluids and for all variations in the specific gravities of blood. It will be understood that a particular meter will accurately measure the flow rate of different parenteral fluids of a group on the same scale only when the drag force on the float produced by the fluids of the group increases proportionately with increases in the specific gravities of the fluids, which is correlated to increases in the viscosities of the fluids. Thus, one group of parenteral fluids having similar flow and viscosity characteristics, such as dextrose and saline solutions, can be measured on the same calibrated scale of the meter, but a meter having different calibrations would be required for fluids of another group, such as bloods of different specific gravities. In other words, the different fluids of a group which can be accurately measured on the same calibrated scale must have viscosity characteristics to produce a drag force on a float of the same range of magnitude.

[It has been found in a meter for parenteral fluids including 1% to 20% dextrose solutions and normal salt solutions, that a float having a specific gravity of .924 will accurately indicate the flow rate of the different liquids within the entire range of flow rates used in injection apparatus. In the meter used for bloods of different specific gravities, a float with a specific gravity of .960 will produce an accurate indication of the flow rate over the entire range.]

While the meter of the present invention has been described for use with parenteral fluids and blood, it can be used with any other group of fluids in which the drag force increases at a rate functionally related to increases in the specific gravity of the fluids. For example, the meter of the present invention could be used to accurately measure the rates of flow of oils having different specific gravities and viscosities on the same calibrated scale.

Figure 1:
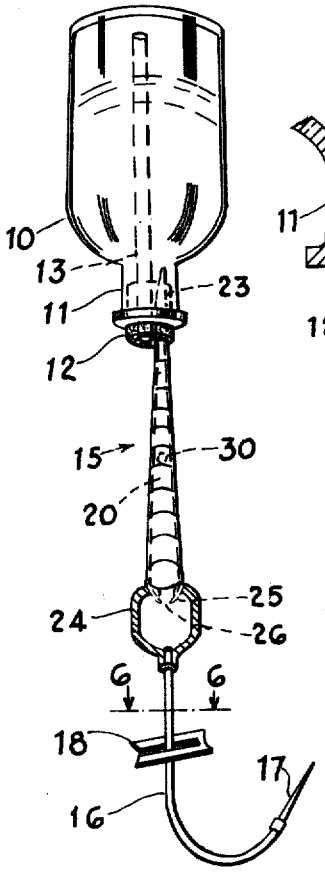
FIGURE 1 is a side elevational view of an injection apparatus incorporating the flow meter of the present invention.

Referring now to the drawings, FIGURE 1 illustrates an injection apparatus incorporating the flow meter of the present invention. The apparatus comprises a container 10 for a parenteral liquid, illustrated as a bottle, which is suspended at some level to cause the liquid to flow to a patient by gravity during an injection. The bottle 10 has a neck 11 at its underside which is closed by a stopple 12. Stopple 12 has a tube 13 therein which extends to the opposite end of the bottle to permit atmospheric air to flow into the bottle and displace liquid flowing therefrom.

Figure 6:
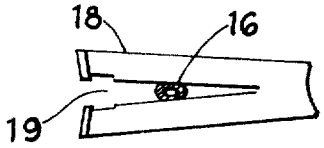
FIGURE 6 is a sectional view taken on line 6—6 of FIGURE 1 to show the clamp for regulating the flow of liquid from the float chamber to maintain the float immersed in the liquid.

The flow meter 15 of the present invention has an upper end connected to the bottle 10 through the stopple 12 and its lower end connected by flexible tubing 16 to a hypodermic needle 17. A suitable flow control clamp 18 is provided below the flow meter 15 for squeezing the flexible tubing 16. As illustrated in FIGURE 6, the clamp 18 is of generally rectangular shape having a V-shaped slot 19 in one end so that the clamp may be pressed transversely of the tubing 16 to deform the tubing to varying degrees and thereby vary the rate of flow of the liquid to needle 17.

Flow meter 15 has a float chamber 20 formed by a conical wall 21, see FIGURE 2, of a suitable transparent material, preferably an acrylic or any other suitable transparent and non-toxic plastic, and having a calibrated scale 22 of horizontal lines scored on its periphery. A hollow reduced neck 23 projects upwardly from float chamber 20 and is cut at an angle to provide a sharp pointed end adapted to puncture the stopple 12 in the bottle 10. While not necessary to the operation of the meter, it is desirable in an injection set to provide a chamber in the liquid stream for separating any air or gas from the liquid. Accordingly, a separating chamber 24 is provided for this purpose which, merely for the purpose of illustration, is shown as a conventional drip chamber at the lower end of the float chamber. Drip chamber 24 is formed by a septum wall 25 between it and float chamber 20 and the septum wall has a central opening 26 with a depending lip 27 from which liquids drip from the float chamber 20 into drip chamber 24. The continuous wall of the drip chamber 24 is preferably made of a flexible transparent material, such as a polyvinyl plastic to observe the drops and adapt it to be squeezed and deformed to remove air from the flow meter. The flow meter 15 may be molded in one piece, the septum wall 25 and the drip chamber 24 molded as separate pieces and the pieces joined to each other in an integral structure as by heat sealing, or the septum wall may have a press fit only with the chamber.

A float 30 is provided in the float chamber 20 having the particular specific gravity required in accordance with the present invention to adapt it to move to the same equilibrium position in the chamber in liquids having different specific gravities at the same flow rate. For example, the bottle 10 may contain parenteral liquids having different specific gravities, such as a normal saline solution having a specific gravity of 1.009 or a 20% dextrose solution having a specific gravity of 1.20, and float 30 has a particular specific gravity to adapt it to accurately measure the flow rate of the different liquids directly on the same calibrated scale 22.

Figure 5:
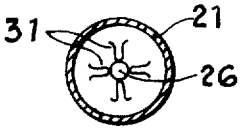
FIGURE 5 is a sectional view taken on line 5—5 of FIGURE 2 to show the flutes at the end of the float chamber to prevent the float from being jammed against the chamber wall.

Both the float chamber 20 and float 30 may have other shapes, but in the illustrated embodiment the chamber is conical and the float spherical. Also, the diameter, length and angle of taper of the conical wall of the float chamber 20 may be varied to vary the range of the rates of flow to be measured in accordance with the present invention. In a particular meter 15 which accurately measures the flow rates of a group of parenteral liquids on the same calibrated scale comprising normal saline solution, 1% to 20% dextrose solutions and solutions containing dissolved salts at flow rates in a range from 25 cc. per hour to 1000 cc. per hour, the float chamber 20 is 2.50 inches long and tapered from an inside diameter of .135 inch at its upper end to .188 inch at its lower end and contains a spherical float .119 inch in diameter [and having a specific gravity of .924]. The float chamber 20 is provided with angularly spaced ribs or flutes 31, see FIGURE 5, having rounded inner edges at both the top and bottom of the chamber to permit the flow of liquid between the flutes to and from the chamber and preventing the float from sticking to the wall of the chamber. One form of construction having been described in detail, the mode of operation is now explained.

Assuming for the purpose of description that the bottle 10 filled with a parenteral fluid, has been hung at an elevated position, the neck 23 of the flow meter 15 has been inserted through the stopple 12 in the bottle and the clamp 18 is positioned to pinch and completely close tube 16. Upon actuation of clamp 18 to open tube 16, parenteral liquid will flow from bottle 10 through the opening in the neck 23 of meter 15 into float chamber which then drips into drip chamber 24 and flows through tube 16 to needle 17. Such flow is continued until the float chamber 20, tube 16 and needle 17 are completely filled at which time clamp 18 is operated to close tube 16. Float 30 will then be positioned at the upper end of float chamber 20 as illustrated in FIGURE 2. The liquid will stand at some level in the drip chamber 24 below the top at which the pressure of the air above the liquid level will equal the pressure of a hydrostatic head of the liquid from the level in the drip chamber to the level in bottle 10. The liquid which flows from bottle 10 is displaced by air flowing into the bottle from the atmosphere through tube 13.

Figure 3:
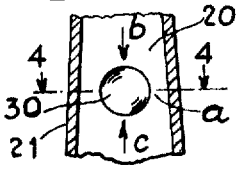
FIGURE 3 is a sectional view of a fragment of the float chamber to illustrate the float in an equilibrium position therein and the opposing buoyant and drag force acting on the float at a particular flow rate and velocity of liquid between the sides of the float and walls of the float chamber.
Figure 4:
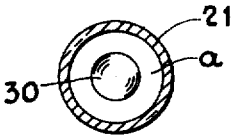
FIGURE 4 is a transverse sectional view taken on line 4—4 of FIGURE 3 to show the annular opening between the float and wall of the float chamber when the float is in an equilibrium position.

Needle 17 is then inserted into a vein of the patient and clamp 18 operated by the attendant to open tube 16 which permits the fluid to flow from needle 17 into the vein of the patient. Immediately upon flow of liquid from needle 17, the pressure in drip chamber 24 is decreased, liquid drips from float chamber 20 and liquid enters the top of float chamber from bottle 10. As the liquid flows through the annular space a, between the periphery of the float 30 and wall of the float chamber 20, see FIGURES 3 and 4, the velocity increases and produces a drag force b corresponding to the velocity. The drag force b is opposed by a buoyant force c equal to the difference in the weight of the float and the weight of liquid displaced. If the drag force is greater than the buoyant force, the float moves downward in float chamber 20 and increases the area of annular space a which decreases the velocity of the liquid as it flows by the float and the drag force b applied to the float. Thus, the float 30 moves to an equilibrium position in float chamber 20 where the drag force b equals the buoyant force c. This particular position of float 30 indicates a particular flow rate on the calibrated scale 21. If the flow rate of liquid into chamber 20 increases, the float 30 will move to a lower position illustrated in FIGURE 2 and if the flow rate decreases, the float will move to a higher position and each position indicates a rate of flow on the calibrated scale. The attendant manipulates clamp 18 to produce the flow rate desired as indicated by the position of the float 30 relative to the scale 22. As liquid drips from chamber 20 to chamber 24, air is separated from the liquid and the drip rate can be observed.

When the flow meter 15 is used with another parenteral fluid of the group having a different specific gravity, the float 30 will move to the same equilibrium position in the chamber 20 for the same flow rate due to its particular specific gravity which will produce an increased buoyant force b in the liquid of different specific gravity which is equal to the increased drag force c on the float 30 at the same position and rate of flow. Thus, the flow rate of liquids having different specific gravities may be accurately measured on the same calibrated scale 22.

FIGURES 7 and 8 illustrate a flow meter 15' of modified construction which is particularly adapted for use in accurately measuring bloods of different specific gravities. In this modified construction the flow meter 15' has a float chamber 20' with a downwardly and outwardly tapered conical wall the same as in the meter 15 illustrated in FIGURE 2. In the modified construction, however, radial fin walls 40 and 41 project inwardly from the conical wall of the float chamber and terminate in parallel relation with concentric cylindrical surfaces 42 and 43. The float is illustrated as a spherical ball 30' positioned between the concentric surfaces 42 and 43 at the inner edges of the radial fin walls 40 and 41 which form a cage in which the float is confined as it moves vertically in the float chamber 20'. The surface of the spherical float 30' is accurately formed and the cylindrical surfaces 42 and 43 are spaced only a few thousandths of an inch from the periphery of the ball.

The float 30' moves to different positions of equilibrium in float chamber 20' the same as in flow meter 15 illustrated in FIGURE 2 to indicate different rates of flow. Due to the location of float 30 closely adjacent the inner edges 42 and 43 of the radial fins 40 and 41, the position of the float in the opaque blood can be clearly observed through the transparent fin wall at the exterior of the float chamber 20.

It has been discovered that a float having a specific gravity of .96 will accurately indicate bloods in the normal range of specific gravities and viscosities.

It will now be observed that the present invention provides an improved flow meter which will accurately indicate the rate of flow of a plurality of fluids having different specific gravities. It also will be observed that the present invention provides a flow meter which will accurately indicate on the same calibrated scale the flow rate of a plurality of parenteral fluids. It further will be observed that the present invention provides a flow meter which will accurately indicate on the same scale the flow rate of bloods having different specific gravities. It will still further be observed that the present invention provides a flow meter of the type indicated which is of simple and compact construction, adapted for economical manufacture and one which is reliable in operation.

While two forms of the invention are herein illustrated and described, it will be understood that further changes may be made in the construction and arrangement of elements without departing from the spirit or scope of the invention. Therefore, without limitation in this respect the invention is defined by the following claims:

1. An injection set for parenteral liquids comprising in combination, a container for parenteral liquids, a float type flow meter, an injection needle, tubes connecting the container to the flow meter and the flow meter to the needle, means for controlling the flow to the needle to maintain the flow meter filled with liquid, said flow meter comprising a continuous wall of transparent material forming an annular chamber diverging downwardly from the container toward the needle, said tube for connecting the container to the flow meter being directly connected to the upper small end of the downwardly diverging chamber so that parenteral liquid flows downwardly therethrough, a float in said chamber having a specific gravity less than the specific gravity of the liquid, said float being buoyed up by a force equal to the difference in the weight of the float and liquid displaced and opposed by the drag force of the solution flowing downwardly through the chamber and acting to position the float in equilibrium at a position corresponding to a particular rate of flow, and a calibrated scale in fixed relation to the wall of said chamber to accurately indicate the rate of flow of solution therethrough.

2. An injection apparatus for injecting parenteral liquids of a group comprising normal saline solution, 1% to 20% dextrose solution and solutions containing dissolved salts, a container for parenteral liquid, a meter which accurately indicates on one calibrated scale the rates of flow of the parenteral liquids having different specific gravities, said meter comprising a float chamber having a continuous wall diverging downwardly, means for delivering liquid from the container to the upper end of the downwardly diverging chamber for flow downwardly therethrough, means for controlling the flow from the chamber to maintain the chamber filled with the liquid as it flows therethrough, a float in said chamber which is buoyed up by a force equal to the difference in weight of the float and fluid displaced and opposed by equal force produced by the drag of the flowing fluid on the surface of the float to maintain the float in equilibrium at a particular position in the chamber for a particular flow rate, and said float having a particular specific gravity [of 0.924] which is so correlated to the specific gravities of the particular fluids being measured that it will produce an increased buoyant force on the float in the fluid of higher specific gravity which is equal and opposite to the increased drag force on said float by said fluid of higher specific gravity at the same velocity and flow rate of the different fluids whereby the float will have the same equilibrium position in the chamber for the fluids of different specific gravities at the same flow rate.

3. A meter in accordance with claim 1 in which the chamber comprises a tapered wall of transparent plastic, angularly spaced ribs of a transparent plastic projecting inwardly from the wall of the chamber and having inner edges providing a guideway at the axis of the chamber, and said float being movable in said guideway with its sides closely adjacent the inner edges of the spaced ribs so that it may be observed through the transparent ribs when immersed in an opaque liquid.

4. A meter in accordance with claim 3 in which the inner edges are of cylindrical contour and the float is spherical and retained by the cylindrical edges of the ribs.

5. A meter in accordance with claim 1 in which a drip chamber is provided between the float chamber and means controlling the flow, said drip chamber being connected to the lower end of the float chamber, and a septum between the chambers having a drip opening therein.

6. A meter for indicating on a single calibrated scale the flow rates at non-critical flow velocities of any of a selected group of liquids of different specific gravities which increase the drag force on a submerged float proportionately with increases in the specific gravity of the liquids at the same flow rate comprising, a float chamber having a continuous wall diverging downwardly, means for delivering liquid to the top of said chamber for flow downwardly therethrough, valve means beyond the outlet end of the float chamber for varying the rate of flow from the chamber to maintain the chamber filled with the liquid, a float in said chamber which is maintained in equilibrium at a particular position in the chamber for a particular flow rate by the opposed buoyant and drag forces acting on the float, a calibrated scale related to said chamber for indicating the position of the float in the chamber, and said float having a particular specific gravity correlated to the specific gravities of the liquids of the group to produce a buoyant force on the float in any of the liquids of the group which is substantially equal and opposed to the increased drag force on said float at the same position of the float in the chamber and at the same flow rate of said liquids of different specific gravities.

The following references, cited by the Examiner, are of record in the patented file of this patent or the original patent.

References Cited by the Examiner

UNITED STATES PATENTS

| | | | |
|---|---|---|---|
| 2,009,427 | 7/1935 | Bentzel | 73—202 |
| 2,335,799 | 11/1943 | Schwab | 128—214 |
| 2,441,350 | 5/1948 | Fischer | 73—209 |
| 2,672,051 | 3/1954 | Butler | 73—209 |
| 3,034,504 | 5/1962 | Winsor et al. | 128—214 |

RICHARD A. GAUDET, *Primary Examiner.*

DALTON L. TRULUCK, *Examiner.*